United States Patent [19]
Berinde et al.

[11] 3,819,901
[45] June 25, 1974

[54] WELDING PROCESS USING GRANULAR OR POWDER FILLER DELIVERED ON OPEN-CHANNEL STRIP

[75] Inventors: Vasile Berinde; Adolf Million; Nicolae Greavu; Carol Million, all of Bucharest, Romania

[73] Assignee: Institute De Cercetari Tehnologice Pentru Constructii De Masini, Soseaua, Romania

[22] Filed: Sept. 14, 1972

[21] Appl. No.: 289,065

[52] U.S. Cl. ............................... 219/76, 219/121 P
[51] Int. Cl. ................................................ B23k 9/04
[58] Field of Search .......................... 219/76, 121 P

[56] References Cited
UNITED STATES PATENTS

| | | | |
|---|---|---|---|
| 1,977,128 | 10/1934 | Hawkins | 219/76 X |
| 3,134,893 | 5/1964 | Toulmin, Jr. | 219/76 X |
| 3,405,247 | 10/1968 | Hlivka | 219/76 |
| 3,517,156 | 6/1970 | Arnoldy | 219/76 |
| 3,573,090 | 3/1971 | Peterson | 219/76 |
| 3,591,759 | 6/1971 | Stand | 219/76 |
| 3,679,858 | 7/1972 | Bollinger | 219/76 |

*Primary Examiner*—Thomas J. Kozma
*Attorney, Agent, or Firm*—Karl F. Ross; Herbert Dubno

[57] ABSTRACT

The invention relates to a surfacing process for metallic parts by applying to them layers constituted of special alloys, the component being melted in a plasma jet. In order to form a weld surfacing layer, a trough shaped metallic sheet strip receives by free fall powder or granular alloying materials, the strip being continuously pushed forward into the melting zone of a plasma jet, which simultaneously melts the basic material surface and the metallic strip and the powder or grains deposited on it, the ratio between the metal quantities resulting from the strip and from the powder or grains respectively, being adjusted by varying the trough shape and width. For obtaining weld surfacing layers with required geometrical parameters and chemical composition which can be adjusted within large limits, a mechanized outfit is used, consisting of a carriage on which are placed a support for the strip coil, a rotating column, a shaping device driven by an electric motor, a container with shutter for the storage of alloying powders or grains, an oscillating mechanism driven by an electric motor provided with two adjustment arms, three handles for the control of the shaping machine, container and plasma torch and a runway on which the carriage is shifted. Besides these exist electric current, protection gas and cooling water feeding units and a control panel.

1 Claim, 4 Drawing Figures

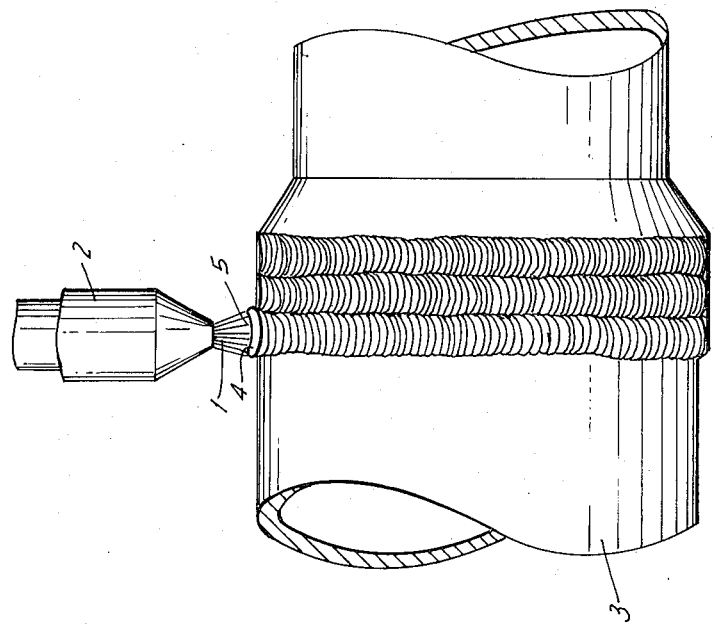
FIG. IA
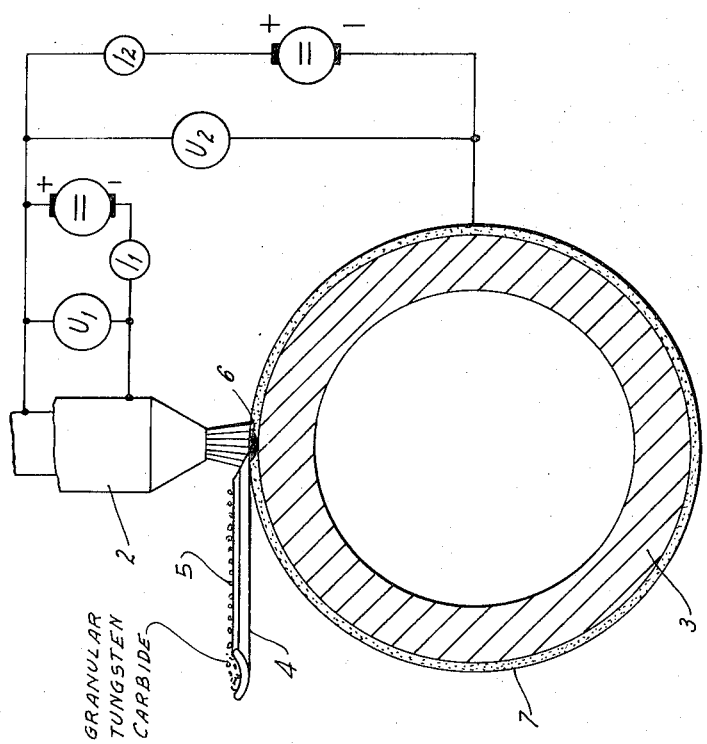
FIG. IB

WELDING PROCESS USING GRANULAR OR POWDER FILLER DELIVERED ON OPEN-CHANNEL STRIP

The invention relates to a welding process used for building-up metallic surfaces with the purpose of applying thereupon layers constituted of alloys with special properties, obtained by the simultaneous melting of the components in a plasma jet, the operation being mechanized by means of an adequate outfit.

The building-up of metallic surfaces is used with all kinds of machinery parts and elements, manufactured from usual metals and alloys, in order to confer upon their surfaces special properties as for instance: resistance to wear, resistance to corrosion, resistance to high temperatures, etc.

There are already known various processes for welding on metallic surfaces by means of a plasma jet:
- surfacing with metallic powders introduced and melted within a plasma jet;
- surfacing with wires mechanically introduced under the plasma torch, directly into the molten bath on the basic metal surface; and
- combinations of the above mentioned processes, introducing the wire directly into the molten metal bath while the metallic powders are introduced either directly into the bath, or into the plasma jet.

The shortcomings common to all these processes arise because the deposition of special-property layers with complex alloying is rendered difficult either because of the necessity of having available complicated feeding systems for the powders, or because of the impossibility of obtaining these alloys in continuous-wire form.

Of course, when the metallic powders are directly introduced into the plasma jet, or directly into the molten melt bath, they must comply with certain special granulation conditions, and the surfacing outfit must be provided with complicated feeding systems in order to avoid forbidden changes of the surfacing layer composition due to the non-uniformities in powder feeding; when using the additional materials only under wire form, the possibilities of the above mentioned processes are limited because of the necessity of previously manufacturing the wires with the required compositions, it being well known that a series number of alloys and metal mixtures cannot be rolled or drawn as wires.

There is also known a process using a tubular electrode filled with carbide particles which melt under the action of heat and deposit 22 on the part surface; this process has the shortcoming that feeding of the hard material to the part surface is difficult, and at the same time, the process of manufacturing the electrodes is tedious.

Some processes use metallic bands which have included alloying elements in their composition. As in the previous example, the shortcomings are due to the difficulty of adjusting the quantity of hard material on the part surface.

The present invention eliminates the shortcomings of the above-mentioned processes by forming a metallic weld surfacing layer using as additive material a metallic sheet strip shaped as a trough, in which are deposited, by free fall, the alloying elements in powder or grain form, the strip being continuously pushed into the melting zone of a plasma jet, which simultaneously melts the basic metal surface, the metallic strip and the powders or grains placed on it, the ratio between the metal quantities resulted from the sheet strip, respectively from powders or grains, the adjustment being achieved by the sheet strip thickness and width, respectively by the trough width and shape, which determine the quantity of powders or grains contained on the sheet strips unit of length.

The invention is further described in conjunction with the accompanying drawing, in which:

FIGS. 1A and 1B are respectively a side and an end sectional view of a drilling tool joint while being weld surfaced with granular tungsten carbide and with steel coming from sheet strip;

Figure 3:
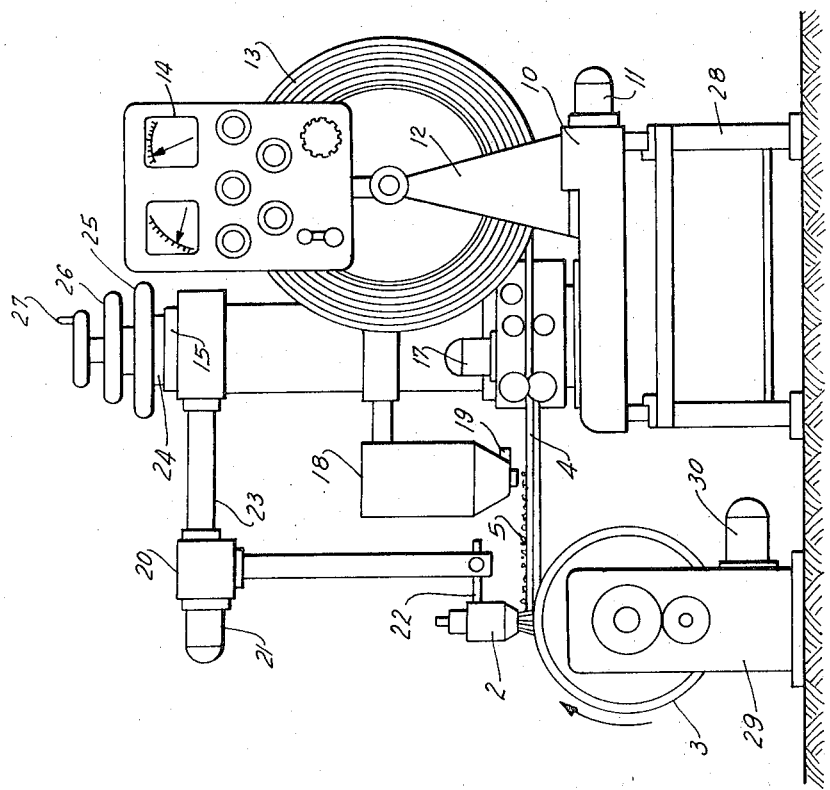
FIG. 3 is a general view of the outfit used for plasma weld surfacing of a drilling tool joint.

The process, according to this invention consists of the simultaneous melting in the plasma jet 1, generated by a plasma torch 2, of the part 3 surface and of a steel sheet strip, shaped as a trough, as well as of the tungsten carbide grains 5, placed on the sheet strip 4; in this way a welding pool 6 is formed which, by rotating the part 3 in the direction shown by the arrow, solidifies and gives a weld-deposited layer 7, constituted of partially molten tungsten carbide grains 8 included in a binder 9 constituted on its turn, from the sheet strip 4 total melting and from partial melting of the tool joint and of the tungsten carbide grains 5.

The melting degree of all these is established by adjusting the direction, sense and introduction position of strip 4 in the melting zone, as well as by adjusting the electrical parameters and the plasma torch 2 position with respect to the tool joint 3.

The process as a whole, is realized by a unitary outfit constituted of a carriage 10, driven by an electric motor 11, on which are placed sheet strip coil 13, supports 12, a control panel 14, a cast supporting rotating column 14, a shaping device 16 driven by an electric motor 17, a powder container 18 provided with a shutter 19, an oscillating mechanism 20, driven by an electric motor 21, the adjustment arms 22 and 23 and the adjusting mechanism 24 with handwheels 25, 26 and 27.

Nearby the carriage 10, which is displaceable on the rolling track 28, is found a part-turning mechanism 29 for part 3, driven by an electric motor 30. The device is also provided with an electric current, water and protection gas feeding unit, not shown.

When welding circularly, the carriage 10 is stationary and the part 3 is rotated in the device 29. By means of the adjusting mechanism and handle 25, simultaneously raising of the shaping machine 16, the grain or powder container 18 and the arm 25 with the oscillating mechanism 20 and plasma torch 2; by means of handle 26 the position of container 18 can be adjusted with respect to the shaped sheet strip 4 and consequently the height of the grains layer 5; by means of handle 27, the plasma torch 2 height can be adjusted with respect to the shaped sheet strip 4 with the layer 5 thereon, and by adjusting the length of arms 22 and 23 we can alter the oscillating amplitude of the plasma torch 2 and its position with respect to the part 3; by corresponding selection of the part 3 rotation direction, and by correspondingly tilting the shaping machine 16, we can also adjust the introduction direction and sense of the addition of the materials 4 and 5 in the tool joint 3 melting zone.

The torch 2 oscillation speed, the shaped strip 4 advancing speed, the tool joint 3 rotation speed is adjusted from panel 14 by means of the variable speed motors 21, 17 and 30 respectively. The melting process energetic regime, the plasmogene and protection gas output, as well as the plasma torch 3 cooling water flow, are adjusted from the feeding unit control panel.

The strip 4 profile shape is adjusted by correspondingly selecting the roller shapes of device 16, as well as the width and thickness of the sheet strip from coil 13. After all the parameters were adjusted in order to obtain a surfaced layer 7 of a certain width, penetration depth and superelevation, as well as after the corresponding selection of the tungsten carbide granulation, the whole surfacing process is carried on by mechanized means, being controlled from the control panel 14.

Under laboratory conditions, there was performed the plasma weld surfacing, of some tool joints, the tool joints, being manufactured from type 41 MoC11 low alloyed heat-treatable steels, (0.43 % C, 0.31 % Si, 0.79 % Mn, 0.025 % S, 0.021 % P, 0.22 % Mo and 1.2 % Cr), the additive materials being mild steel sheet strip, size 0.5 × 20 mm, and 20–30 mesh tungsten carbide grains.

The tool joint surfacing weld parameters were: $I_1 = 60$ A; $I_2 = 140$ A; $U_1 = 18$; $U_2 = 34-36$ V; plasma gas $Q = 1$ l/min; protection gas $Q=8$ l/min; $n$ (part rotation speed) $= 0.25$ r.p.m.; tool joint OD=180 mm (part outer diameter).

Figure 2:
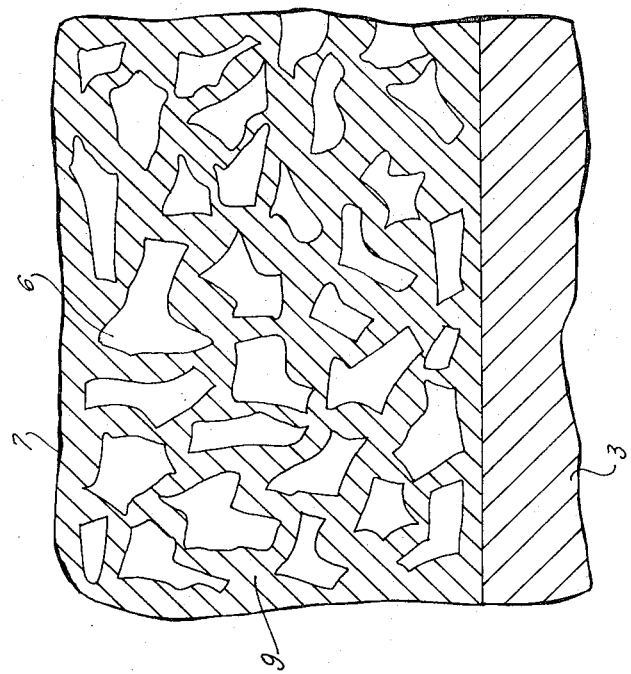
FIG. 2 is a cross-section through the steel and tungsten carbide layer weld deposited on a drilling tool joint.

There was obtained a weld-deposited layer 4–5 mm thick and 24 mm wide in which were also included the non-melted tungsten carbide grains, as can be seen from FIG. 2.

The microstructural samples have shown that the tungsten carbide grains were not melted.

The process, according to this invention features the following advantages:

the metals alloy or mixture constituting the surfacing layer, is obtained within the melting and welding zone, by simultaneously melting of the strip and the powder or grains with desired composition, ensuring thus a large adjustment range for the chemical composition allowing formation of alloys or metal mixtures which otherwise can't be obtained in wire or sheet strip form, eliminating the need for complicated devices for feeding the powders or grains into the plasma melting zone by previously mixing them and feeding them by letting them fall freely on the strip which constitutes, on one hand, an alloying component, and on the other hand, a fusible conveying band for the added powders or grains;

the apparatus constitutes a compact unit enabling it to be used as a fixed outfit for surfacing small parts as well as a mobile outfit for surfacing plates, shell rings and large parts in general;

the multiple adjustment possibilities ensure the formation of varied-geometry surfacing layers, with the required width, penetration depth and reinforcement; and the apparatus can be used for plasma weld surfacing by using as additional material only wire and sheet strip, without adding powders or grains, with the possibility to introduce electric current through wire or sheet strip too.

What is claimed is:

1. A process for the deposition of a weldment containing a powder or granular material upon a metallic body, comprising the steps of:
    a. melting a surface portion of said body by training a plasma jet thereon;
    b. forming a fully open channel by bending upwardly marginal portions of a continuous strip of weld material and continuously feeding said channel toward said plasma jet for melting of the channel by said jet; and
    c. cascading said powder or granular material into the open channel and entraining it in said open channel into the region of said plasma jet without closing said channel thereby controlling the proportions of the channel strip material and said powder or granular material incorporated in said weldment substantially only by the quantity of said powder or granular material freely retained in the open channel.

* * * * *